(12) United States Patent
Suzaki et al.

(10) Patent No.: US 11,733,344 B2
(45) Date of Patent: Aug. 22, 2023

(54) INTERFERENCE SOURCE SEARCHING METHOD AND INTERFERENCE SOURCE SEARCHING APPARATUS

(71) Applicant: NIPPON TELEGRAPH AND TELEPHONE CORPORATION, Tokyo (JP)

(72) Inventors: Kohei Suzaki, Musashino (JP); Ryo Miyatake, Musashino (JP); Yusuke Asai, Musashino (JP); Hiroyuki Shiba, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 308 days.

(21) Appl. No.: 16/973,408

(22) PCT Filed: May 21, 2019

(86) PCT No.: PCT/JP2019/020042
§ 371 (c)(1),
(2) Date: Dec. 8, 2020

(87) PCT Pub. No.: WO2019/239818
PCT Pub. Date: Dec. 19, 2019

(65) Prior Publication Data
US 2021/0239785 A1 Aug. 5, 2021

(30) Foreign Application Priority Data

Jun. 11, 2018 (JP) .................................. 2018-111195

(51) Int. Cl.
*G01S 5/02* (2010.01)
*H04B 17/27* (2015.01)
(Continued)

(52) U.S. Cl.
CPC .............. *G01S 5/0278* (2013.01); *G01S 5/02* (2013.01); *G01S 5/0215* (2013.01); *G06T 7/246* (2017.01);
(Continued)

(58) Field of Classification Search
CPC . G01S 5/0278; G01S 5/02; G01S 5/04; G01S 5/0215; G01S 5/011; G01S 11/06;
(Continued)

(56) References Cited

U.S. PATENT DOCUMENTS

2003/0114983 A1* 6/2003 Irvin ....................... G01S 19/21
701/473
2004/0164902 A1* 8/2004 Karlsson ................. G01S 3/046
342/464

(Continued)

FOREIGN PATENT DOCUMENTS

JP 2017142180 A 8/2017

OTHER PUBLICATIONS

Hideya So et al., Delay Performance Evaluation under Interference from Other System of Highly Reliable and Low Latency Radio Access Scheme by Utilizing Duplicated Transactions, IEICE Technical Report, Jul. 2017, pp. 155-160.

(Continued)

*Primary Examiner* — Quoc Thai N Vu
(74) *Attorney, Agent, or Firm* — Harness, Dickey & Pierce, P.L.C.

(57) ABSTRACT

An interference source hunting method of hunting for an interference source of electromagnetic waves while moving between multiple measurement points, includes the steps of acquiring strength information of electromagnetic waves, estimating a distance from the measurement point to the location of the interference source, based on the strength information, calculating a first presence probability that the (Continued)

interference source is present at each position, based on whether a distance from the measurement point to the position is within the distance, updating second presence probabilities acquired in hunting in the past, based on the first presence probabilities, determining a position obtained by moving, by a predetermined distance, the measurement point toward a position with the second presence probability higher than the second presence probability at the measurement point, as a new measurement point, and determining, in a case where a size of an area in which each of the second presence probabilities is greater than or equal to a predetermined value is less than a predetermined value, that the location of the interference source is within the area.

8 Claims, 13 Drawing Sheets

(51) Int. Cl.
*H04B 17/345* (2015.01)
*G06T 7/246* (2017.01)
*G01S 5/00* (2006.01)

(52) U.S. Cl.
CPC ............ *H04B 17/27* (2015.01); *H04B 17/345* (2015.01); *G01S 5/011* (2020.05); *G06T 2207/30192* (2013.01)

(58) Field of Classification Search
CPC ...... G01S 5/0218; G01S 5/0249; G01S 19/21; G06T 2207/30192; G06T 7/246; H04B 17/27; H04B 17/345; H04B 17/26
See application file for complete search history.

(56) References Cited

U.S. PATENT DOCUMENTS

2012/0309408 A1* 12/2012 Marti .................... H04W 4/023
455/456.1
2016/0349375 A1 12/2016 Littlefield et al.
2019/0342775 A1* 11/2019 Christopherson ..... H04W 16/10

OTHER PUBLICATIONS

Takahiro Hashimoto et al., Statistical Model of Indoor Radio Propagation Loss Using Geometrical-optical Space Classification, IEICE Technical Report, vol. J99-B, No. 9, 2016, pp. 684-692.

* cited by examiner

Fig. 6

INTERFERENCE SOURCE SEARCHING METHOD AND INTERFERENCE SOURCE SEARCHING APPARATUS

CROSS-REFERENCE TO RELATED APPLICATIONS

This application is a 371 U.S. National Phase of International Application No. PCT/JP2019/020042, filed on May 21, 2019, which claims priority to Japanese Application No. 2018-111195 filed on Jun. 11, 2018. The entire disclosures of the above applications are incorporated herein by reference.

TECHNICAL FIELD

The present invention relates to an interference source hunting method and an interference source hunting apparatus.

BACKGROUND ART

In a situation of facing shortages of frequency resources due to an increase in communication traffic, there is a demand for communication that achieves a high spectral efficiency and highly reliable communication in which quality of service (QoS) is ensured. However, in actual communication environments, signal quality varies greatly due to various factors such as fading and radio wave interference, and this may cause a decrease in throughput and an increase in delay time, for example. For example, radio schemes and the like that use multiple bands simultaneously have heretofore been proposed in order to perform highly reliable and low latency communication (see NPL 1).

Such maximizing of spectral efficiency is assumed to continue in the future. To achieve high spectral efficiency, control of communication resources, such as switching of frequency bands to use and changing of communication schemes, is important. In such control of communication resources, it is necessary to appropriately recognize a state of radio wave usage. For example, a radio wave environment recognition technique using a statistical model and the like have been heretofore proposed in order to appropriately recognize a state of radio wave usage (see NPL 2).

CITATION LIST

Non Patent Literature

NPL 1: Hideya So et al., "Delay Performance Evaluation under Interference from Other System of Highly Reliable and Low Latency Radio Access Scheme by Utilizing Duplicated Transmissions", IEICE Technical Report, RCC2017-42, pp. 155-160, Institute of Electronics, Information and Communication Engineers, July 2017

NPL 2: Takahiro Hashimoto et al., "Statistical Model of Indoor Radio Wave Propagation Using Geometrical-Optical Space Classification", IEICE Transactions on Communications, B Vol. J99-B No. 9, pp. 684-692, Institute of Electronics, Information and Communication Engineers, 2016

SUMMARY OF THE INVENTION

Technical Problem

In order to appropriately recognize a state of radio wave usage, it is necessary to know the location of an access point, the location of an electromagnetic wave interference source causing radio wave interference, and the like. However, in a radio communication environment, a received power may decrease due to multipath fading, shadowing, free space loss due to distance, interference due to other terminals, and the like, and this may cause a decrease in accuracy in estimation of the location of an electromagnetic wave interference source.

In light of the above-described circumstances, an object of the present invention is to provide a technique capable of efficiently hunting for an electromagnetic wave interference source while suppressing effects in a case where a received power has decreased.

Means for Solving the Problem

An aspect of the present invention is an interference source hunting method of hunting for a location of an interference source of electromagnetic waves while moving between multiple measurement points, the multiple measurement points being predetermined positions in a hunting-target area, the interference source hunting method including: a strength information acquiring step of acquiring strength information indicating a strength of the electromagnetic waves at any of the measurement points; a distance estimating step of estimating a distance from the measurement point to the location of the interference source, based on the strength information and propagation losses; a presence probability calculating step of calculating, for each position in the hunting-target area, a first presence probability, based on whether a distance from the measurement point to a position in the hunting-target area is within the distance thus estimated, the first presence probability being a probability that the interference source is present at the position; a presence probability update step of updating second presence probabilities, based on the first presence probabilities, the second presence probabilities being acquired in the hunting in past and being probabilities that the interference source is present at the positions in the hunting-target; a measurement point determining step of determining a position obtained by moving, by a predetermined distance, the measurement point toward a position in the hunting-target area with the second presence probability higher than the second presence probability at the measurement point, as a new measurement point; and a determining step of determining, in a case where a size of an area based on positions each with the second presence probability thus updated greater than or equal to a predetermined value is less than a predetermined value, that the location of the interference source is within the area.

An aspect of the present invention is the above-described interference source hunting method, further including a table storing step of storing a presence probability table in which the positions in the hunting-target area and the second presence probabilities are associated with each other, wherein in the presence probability update step, the second presence probabilities held in the presence probability table are updated based on the first presence probabilities, and in the measurement point determining step, a position obtained by moving, by the predetermined distance, the measurement point toward a position in the hunting-target area with the second presence probability higher than the second presence probability associated with the measurement point in the presence probability table is determined to be the new measurement point.

An aspect of the present invention is the above-described interference source hunting method, in which, in the measurement point determining step, in a case where multiple positions each with the second presence probability being higher than the second presence probability at the measurement point in the hunting-target area exist, multiple positions obtained by moving, by a predetermined distance, the measurement point toward the multiple positions in the hunting-target area are determined to be new measurement points.

An aspect of the present invention is the above-described interference source hunting method, in which in the presence probability update step, the second presence probability is updated for each position in the hunting-target area, based on the corresponding first presence probability obtained through weighting based on a degree of reliability of the strength information.

An aspect of the present invention is the above-described interference source hunting method, in which in the determining step, an image of an object captured at the measurement point and an image held in advance and related to the interference source are compared to determine whether the object is the interference source, and in a case of determining that the object is the interference source, a location of the object is determined to be the location of the interference source.

An aspect of the present invention is the above-described interference source hunting method, in which in the determining step, in a case where an obstacle is present in a neighborhood and a path connecting measurement points passed in moving in past is linear, the location of the interference source is not determined to be within the area.

An aspect of the present invention is the above-described interference source hunting method, in which in the presence probability update step, in a case where a moving object is present in a neighborhood, the second presence probability is updated for each position in the hunting-target area, based on the corresponding first presence probability obtained through weighting according to an amount of motion of the moving object.

An aspect of the present invention is an interference source hunting apparatus configured to hunt for a location of an interference source of electromagnetic waves while moving between multiple measurement points, the multiple measurement points being predetermined positions in a hunting-target area, the interference source hunting apparatus including: a strength information acquiring unit configured to acquire strength information indicating a strength of the electromagnetic waves at any of the measurement points; a distance estimating unit configured to estimate a distance from the measurement point to the location of the interference source, based on the strength information and propagation losses; a presence probability calculating unit configured to calculate, for each position in the hunting-target area, a first presence probability, based on whether a distance from the measurement point to a position in the hunting-target area is within the distance thus estimated, the first presence probability being a probability that the interference source is present at the position; a presence probability update unit configured to update second presence probabilities, based on the first presence probabilities, the second presence probabilities being acquired in the hunting in past and being probabilities that the interference source is present at the positions in the hunting-target; a measurement point determining unit configured to determine a position obtained by moving, by a predetermined distance, the measurement point toward a position in the hunting-target area with the second presence probability higher than the second presence probability at the measurement point, as a new measurement point; and a determining unit configured to determine, in a case where a size of an area based on positions each with the second presence probability thus updated greater than or equal to a predetermined value is less than a predetermined value, that the location of the interference source is within the area.

Effects of the Invention

According to the present invention, it is possible to efficiently hunt for an electromagnetic wave interference source while suppressing effects in a case where a received power has decreased.

BRIEF DESCRIPTION OF DRAWINGS

FIG. 6 is a schematic diagram illustrating an example of an AP presence probability table created by interference source hunting processing by an interference source hunting robot according to a second embodiment of the present disclosure.

DESCRIPTION OF EMBODIMENTS

First Embodiment

Hereinafter, a first embodiment of the present invention will be described with reference to drawings.

Functional Configuration of Interference Source Hunting Robot Hereinafter, a functional configuration of an interference source hunting robot 1 will be described.

Figure 1:
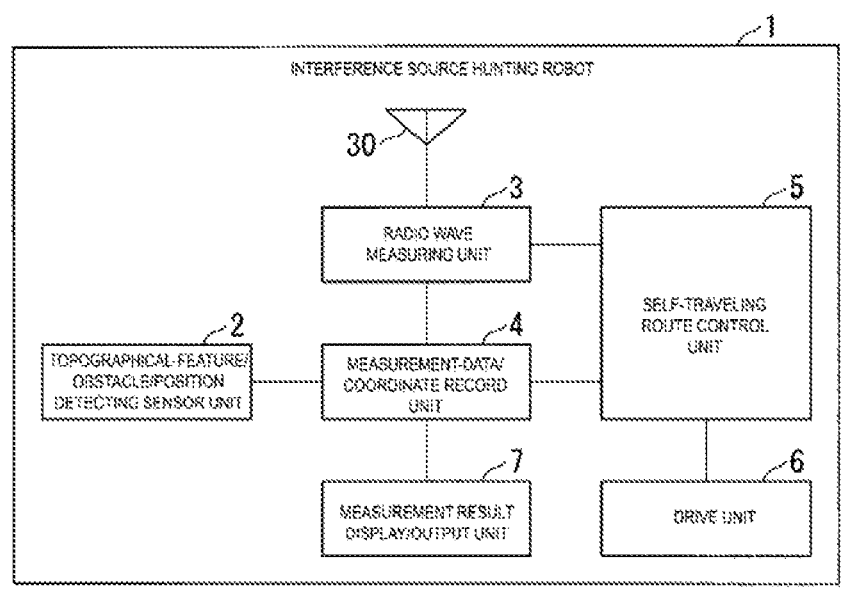
FIG. 1 is a block diagram illustrating a functional configuration of an interference source hunting robot according to a first embodiment of the present disclosure.

FIG. 1 is a block diagram illustrating the functional configuration of the interference source hunting robot 1 according to the first embodiment of the present invention.

The interference source hunting robot 1 is a self-traveling robot capable of hunting for the location of an electromagnetic wave interference source while moving between multiple measurement points, which are predetermined positions within a hunting-target area. As illustrated in FIG. 1, the interference source hunting robot 1 includes a topographical-feature/obstacle/position detecting sensor unit 2, a radio wave measuring unit 3, a measurement-data/coordinate record unit 4, a self-traveling route control unit 5, a drive unit 6, and a measurement result display/output unit 7.

The topographical-feature/obstacle/position detecting sensor unit 2 includes a mechanism capable of measuring a distance such as a two-dimensional or three-dimensional laser range finder and an ultrasonic sensor. The topographical-feature/obstacle/position detecting sensor unit 2 also includes a mechanism capable of acquiring images such as a still-image camera or a video camera, a depth camera, and a thermography. The topographical-feature/obstacle/position detecting sensor unit 2 also includes a mechanism capable of detecting and measuring topographical features and the presence and location of an obstacle such as the GPS and an infrared sensor.

The radio wave measuring unit 3 includes a mechanism capable of acquiring information such as a received signal strength indication (RSSI), a bit error rate (BER), a packet error rate (PER), throughput, identification information identifying a transceiver such as a media access control (MAC) address and a service set identifier (SSID), a modulation parameter (modulation and coding scheme (MCS)), a carrier to noise ratio (C/N), a signal to noise ratio (SN), and a signal to interference ratio (S/I).

As illustrated in FIG. 1, the radio wave measuring unit 3 is connected to an antenna 30. The radio wave measuring unit 3 acquires the various kinds of information described above via the antenna 30. Note that the antenna 30 may be a directional antenna or an omnidirectional antenna (omni antenna). Note that the antenna 30 may be constituted with multiple antennas, and may be configured so that the multiple antennas are used to perform measurement for multiple measurement targets, directional reception, polarization control, delay profile acquisition, delay distribution based on channel estimation results (frequency axis), acquisition of Doppler frequencies, and the like. The antenna 30 may be configured to be able to freely change the position and angle (vertical direction, lateral direction, and height direction) of the antenna for radio wave measurement.

The measurement-data/coordinate record unit 4 converts information detected and measured by the topographical-feature/obstacle/position detecting sensor unit 2 into coordinate data. The measurement-data/coordinate record unit 4 records the coordinate data resulting from the conversion and the measurement data resulting from the measurement by the radio wave measuring unit 3 in association with each other. The measurement-data/coordinate record unit 4 can further associate and record a time point (for example, the current time, a time point of the detection and measurement by the topographical-feature/obstacle/position detecting sensor unit 2, a time point of the measurement by the radio wave measuring unit 3, or the like) with the information in which the coordinate data and the measurement data are associated.

The self-traveling route control unit 5 determines a traveling route for hunting for an electromagnetic wave oscillating source, based on information resulting from the detection and measurement by the topographical-feature/obstacle/position detecting sensor unit 2 and the measurement data resulting from the measurement by the radio wave measuring unit 3, to control the self-traveling. To control self-traveling, the self-traveling route control unit 5 uses the information recorded in the measurement-data/coordinate record unit 4 to compute a traveling route avoiding an obstacle. The self-traveling route control unit 5 outputs an operation instruction to the drive unit 6, based on the computed traveling route. Note that a more detailed configuration of the self-traveling route control unit 5 will be described later.

The drive unit 6 operates based on the operation instruction input from the self-traveling route control unit 5. The drive unit 6 includes a mechanism capable of causing the interference source hunting robot 1 to move, such as a wheel(s), a caterpillar(s), a mechanism for performing biped walking, quadruped walking, or flying. Note that the drive unit 6 may be configured by further including a mechanism for using the information resulting from the detection and measurement by the topographical-feature/obstacle/position detecting sensor unit 2 and the measurement data resulting from the measurement by the radio wave measuring unit 3, to perform position correction and/or correction of vibration and blurring.

The measurement result display/output unit 7 displays and outputs the coordinate information, radio wave measurement information, and time point information finally acquired. The measurement result display/output unit 7 outputs a heat map of the RSSI, radio wave measurement information indicating the BER and/or PER at each measurement point, location information indicating the location and/or direction of an access point AP and/or interference source, and a propagation path of radio waves from the access point AP or interference source. The measurement result display/output unit 7 can also output, together with the above, peripheral-environment/layout information resulting from the detection and measurement by the topographical-feature/obstacle/position detecting sensor unit 2.

Functional Configuration of Self-Traveling Route Control Unit

A functional configuration of the self-traveling route control unit 5 will be described below. As described above, the self-traveling route control unit 5 determines a traveling route for hunting for an electromagnetic wave oscillating source, based on information resulting from the detection and measurement by the topographical-feature/obstacle/position detecting sensor unit 2 and the measurement data resulting from the measurement by the radio wave measuring unit 3, to control the self-traveling.

Figure 2:
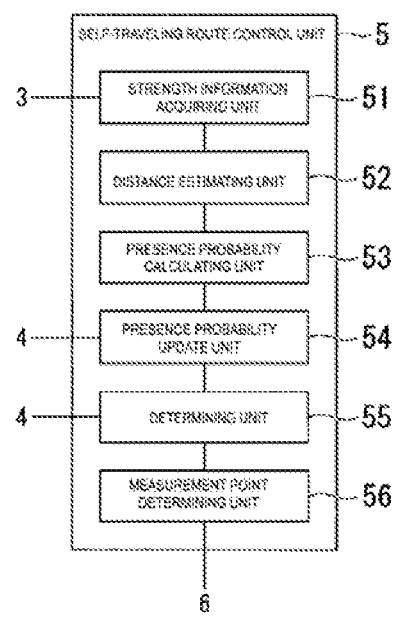
FIG. 2 is a block diagram illustrating a functional configuration of a self-traveling route control unit 5 of the interference source hunting robot according to the first embodiment of the present disclosure.

FIG. 2 is a block diagram illustrating a functional configuration of the self-traveling route control unit 5 of the interference source hunting robot 1 according to the first embodiment of the present invention. As illustrated in FIG. 2, the self-traveling route control unit 5 include a strength information acquiring unit 51, a distance estimating unit 52, a presence probability calculating unit 53, a presence probability update unit 54, a determining unit 55, and a measurement point determining unit 56.

The strength information acquiring unit 51 acquires strength information indicating the strength of electromagnetic waves at a measurement point.

The distance estimating unit 52 estimates the distance from the measurement point to the location of an interference source, based on the strength information and propagation losses.

The presence probability calculating unit 53 calculates a first presence probability for each position in a hunting-target area, based on whether or not the distance from the measurement point to each position in the hunting-target area is within the estimated distance. Here, the first presence probability refers to the probability that the interference source is present at the position.

The presence probability update unit 54 updates a second presence probability, based on the first presence probability. Here, the second presence probability refers to the probability for each position in the hunting-target area that the interference source is present, the probability being obtained through hunting in the past.

The determining unit 55 determines that the location of the interference source is within the area in a case where the size of the area based on the position at which the updated second presence possibility is greater than or equal to a predetermined value is less than a predetermined value.

The measurement point determining unit 56 determines a new measurement point. Here, a position obtained by moving the measurement point by a predetermined distance toward a position in the hunting-target area with the second presence possibility that is higher than the second presence possibility at the measurement point, is determined to be a new measurement point.

The measurement-data/coordinate record unit 4 of the interference source hunting robot 1 stores an AP presence probability table in which each position and the corresponding second presence probability are associated with each other.

The presence probability update unit 54 updates, for each position, the second presence probability held in the AP presence probability table, based on the first presence probability. The measurement point determining unit 56 determines, as a new measurement point, a position obtained by moving the measurement point by a predetermined distance in a direction in which the second presence possibility is higher than the second presence possibility associated with the measurement point in the AP presence probability table.

Specific Example of Interference Source Hunting Method

A specific example of an interference source hunting method performed by the interference source hunting robot 1 will be described below.

Hereinafter, it is assumed that the interference source hunting robot 1 aims to hunt for a location of an access point (hereinafter referred to as an "AP") that transmits electromagnetic waves.

The interference source hunting robot 1 sequentially moves to measurement point 1, measurement point 2, measurement point 3, . . . , measurement point n, . . . , and measurement point N to measure the radio field strength at each measurement point. Here, the radio wave strengths measured at measurement point 1, measurement point 2, measurement point 3, . . . , measurement point n, . . . , and measurement point N are denoted by $S_{meas1}$, $S_{meas2}$, $S_{meas3}$, . . . , $S_{measn}$, . . . , and $S_{measN}$ (n=1 to N, N: natural number). According to Equation (1) below, the probability that an interference source is present within a measurement-target range in the N-th measurement is obtained.

$$S_{eirp0}/S_{measn} = (4\pi d_n/\lambda)^2 \quad \text{[Math. 1]}$$

Here, $S_{measn}$ denotes a measurement value, $S_{eirp0}$ denotes an initial value, $\lambda$ denotes a wavelength, and $d_n$ denotes the distance from the interference source to measurement point n. Note that the value of $S_{eirp0}$ (initial value) is undetermined here, and hence an estimated value such as 1 mW or 10 mW is input. According to Equation (1) above, $d_n$ is expressed by Equation (2) below.

[Math. 2]

$$d_n = \frac{\lambda \sqrt{S_{eirp0}/S_{measn}}}{4\pi} \quad (2)$$

At this time, at the point (x, y, z) in a space, presence probability $P_n(x, y, z)$ of the interference source is given as follows with the distance from the measurement point ($x_n$, $y_n$, $z_n$) as a threshold. Here, it is assumed that the probability at a coordinate point within a sphere is p, and the probability at a coordinate point outside the sphere is q. In this case, it is assumed that $0 \leq q \leq p \leq 1$.

[Math. 3]

$$P_n(x, y, z) = \begin{cases} p, & (x-x_n)^2 + (y-y_n)^2 + (z-z_n)^2 \leq d_n \\ q, & (x-x_n)^2 + (y-y_n)^2 + (z-z_n)^2 > d_n \end{cases} \quad (3)$$

Note that, in a case where the environment is a perfectly ideal environment and that $S_{eirp0}$ is known, the interference source is present on the spherical surface where $(x-x_n)^2 + (y-y_n)^2 + (z-z_n)^2 = d_n$. Hence, by performing measurement only at three points in accordance with a procedure of trilateration, it is possible to estimate an approximate location.

However, in actual environments, signal attenuation due to reflection, shielding, and the like may occur.

In actual environments, even in a case where distances from a signal source are identical, signal powers may differ greatly depending on the antenna radiation patterns. In addition, an object here is to hunt for an interference source, and hence the value of $S_{eirp0}$ is not known in many cases.

In view of these, in update of the presence probability, weighting is performed based on a received power strength actually measured. Every time the number of measurement points increases, a probability $P_{1\_N}(x, y, z)$ is updated as follows.

[Math. 4]

$$P_{1\_N}(x, y, z) = \sum_{n=1}^{N} S_{measn} P_n(x, y, z) / \sum_{n=1}^{N} S_{measn} \quad (4)$$

Thus weighting and overlaying the presence probabilities according to the received power strength allows the weight of a probability estimated at the time when a received power is low to be reduced, while allowing the weight of a probability estimated at the time when a received power is high to be increased. Alternatively, calculating the area or volume within the range, based on an estimated distance $d_1$ results in $2\pi d_1^2$ or $4\pi d_1^3/3$, respectively. It may be configured to calculate, by using either of these values, a probability so that the probability would be higher as the estimated circle or sphere is smaller, as presented in Equation (5).

[Math. 5]

[Math. 5]

$$P_{1\_N}(x, y, z) = \frac{\sum_{n=1}^{N} P_n(x, y, z)/\left(\frac{1}{2\pi d_n^2}\right)}{\sum_{n=1}^{N}\left(\frac{1}{2\pi d_n^2}\right)} \quad (5)$$

$$= \frac{\sum_{n=1}^{N} P_n(x, y, z)/\left(\frac{1}{d_n^2}\right)}{\sum_{n=1}^{N}\left(\frac{1}{d_n^2}\right)}$$

The interference source hunting robot 1 changes a route in a direction with a higher presence probability to move in a direction with a higher radio field strength. This makes it possible to efficiently hunt for an interference source while reducing an influence of an estimated point in a case where a received power is small.

Note that, in the hunting, a profile such as an SSID and the types of various waveforms may be used to perform hunting for only an object matching the profile.

Note that an antenna of a terminal that performs measurement may have directivity to facilitate detection of the direction of a wave source and to thereby increase efficiency of hunting.

Note that, although the calculation formula for free space loss is used as described above, a calculation formula for radio wave propagation in each environment may be used.

Finally, measurement is repeated until the number of combinations of (x, y, z) with which the presence probability of the interference source exceeds a certain threshold α, the size of the area in which the presence probability exceeds certain threshold α, or the volume of the area in which the presence probability exceeds the certain threshold α falls below a certain threshold C, to perform hunting for a location of the AP.

An example of interference source hunting in the above-described interference source hunting method will be described with reference to schematic diagrams.

Figure 3:
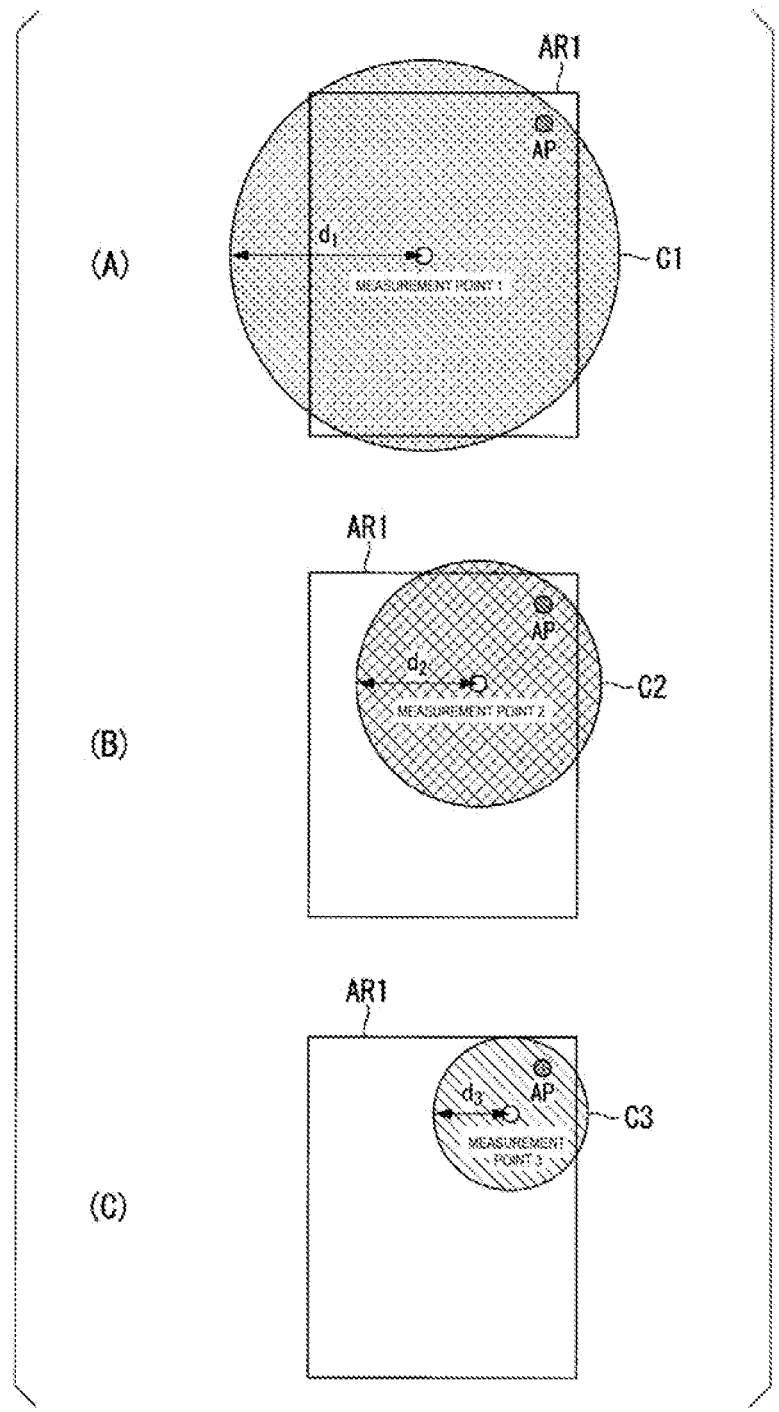
FIG. 3 is a set of schematic diagrams for describing an example of interference source hunting by the interference source hunting robot according to the first embodiment of the present disclosure.
Figure 4:
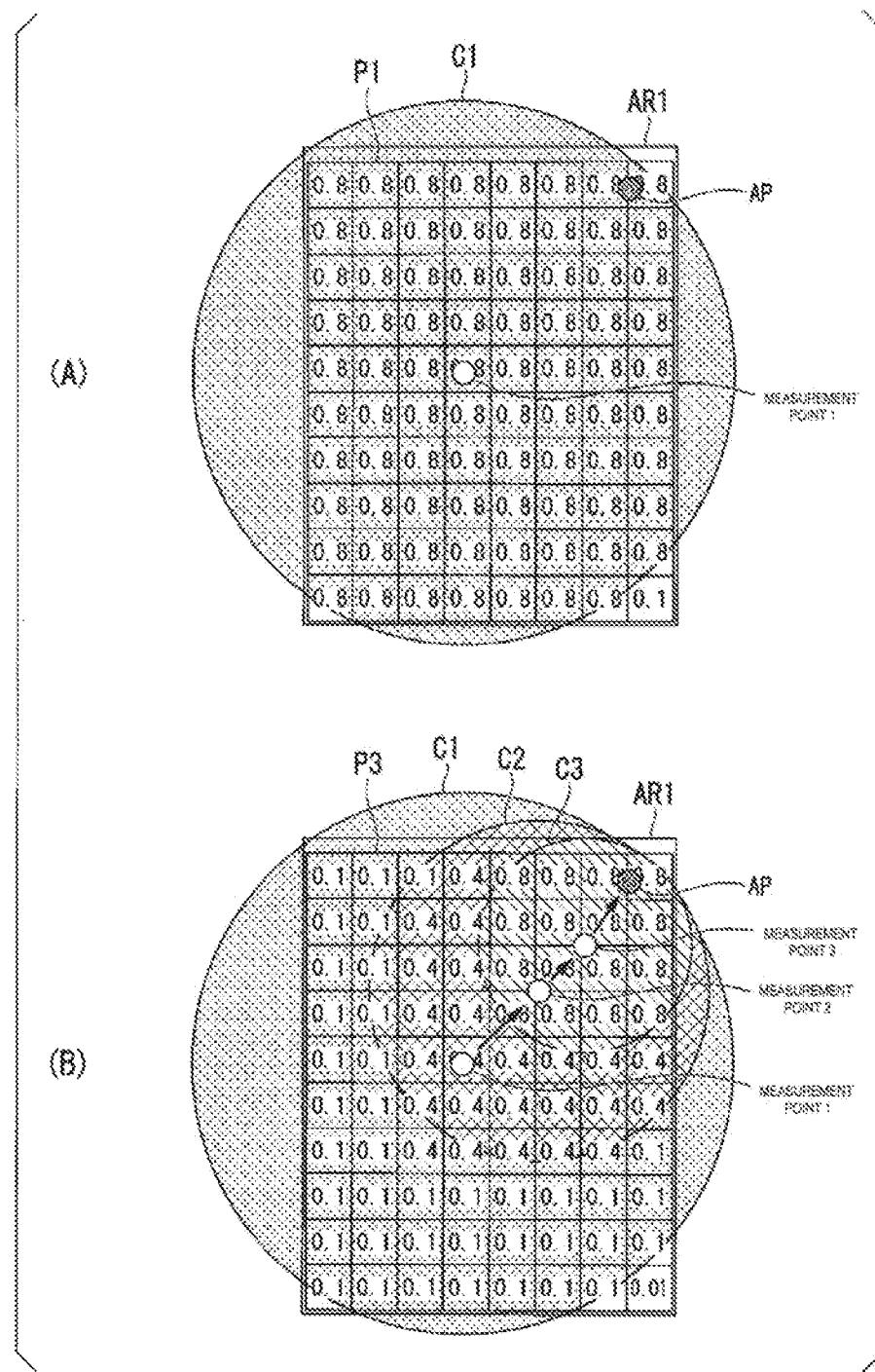
FIG. 4 is a set of schematic diagrams for describing an example of interference source hunting by the interference source hunting robot according to the first embodiment of the present disclosure.

FIGS. 3 and 4 are sets of schematic diagrams for describing an example of interference source hunting by the interference source hunting robot 1 according to the first embodiment of the present invention. Note that, in the example described below, a hunting-target area, which is a target area for hunting an AP, is assumed to be a plane (x, y) for simplicity.

As illustrated in FIG. 3(A), the interference source hunting robot 1 first receives electromagnetic waves at measurement point 1, which is the first measurement point, to measure a radio field strength, wavelength, and the like, to hunt for an AP. Note that the position of measurement point 1 may be any position.

The interference source hunting robot 1 uses the values of the measured radio field strength and wavelength to perform calculation according to Equation (2) in the above-described interference source hunting method, and obtains a distance $d_1$, which is the distance from measurement point 1 to a position where the AP is estimated to be present. FIG. 3(A) illustrates a positional relationship between a hunting-target area AR1, which is a target area of hunting for an AP, and a circular area C1 having a radius of the distance $d_1$ with the center at measurement point 1.

Next, the interference source hunting robot 1 performs calculation according to Equation (3) in the above-described interference source hunting method, for each of multiple small areas obtained by sectioning the hunting-target area AR1 in a mesh pattern, to determine the presence probability of the AP. The interference source hunting robot 1 generates an AP presence probability table P1 indicating the presence probability of the AP for each small area illustrated in FIG. 4(A).

As illustrated in FIG. 4(A), for example, the presence probability of the AP is "0.8" for each small area located inside the circular area C1, while the presence probability of the AP is "0.1" for each small area located outside the circular area C1, among the multiple small areas included in the hunting-target area AR1. In this way, the presence probability is weighted for each small area depending on whether the small area is located inside or outside the circular area C1.

Next, the interference source hunting robot 1 moves by a predetermined distance in a direction of another small area having a higher presence probability of the AP than that of the small area including measurement point 1, which is the current position. The interference source hunting robot 1 determines the position after the move, to be measurement point 2, which is the second measurement point.

Note that, in a stage where the presence probabilities are calculated at measurement point 1, which is the first measurement point, there may only be small areas each having a presence probability of "0.8" or "0.1", for example, as illustrated in FIG. 4(A). In this case, there exist no other small areas having a higher presence probability than the presence probability "0.8" of the AP of any of the small areas including measurement point 1. In this case, the interference source hunting robot 1 may select any of other small areas having a presence probability equal to the presence probability "0.8" of the AP of the small areas including measurement point 1 and move by a predetermined distance in a direction of the selected small area.

As illustrated in FIG. 3(B), the interference source hunting robot 1 then receives electromagnetic waves at measurement point 2, which is the second measurement point, to measure a radio field strength, wavelength, and the like, to hunt for the AP.

The interference source hunting robot 1 uses the values of the measured radio field strength and wavelength to perform calculation according to Equation (2) in the above-described interference source hunting method, and obtains a distance $d_2$, which is the distance from measurement point 2 to a position where the AP is estimated to be present. FIG. 3(B) illustrates a positional relationship between the hunting-target area AR1 and a circular area C2 having a radius of the distance $d_2$ with the center at measurement point 2.

Next, the interference source hunting robot 1 calculates, in a similar manner to that at measurement point 1, a presence probability of the AP for each of multiple small areas obtained by sectioning the hunting-target area AR1 in a mesh pattern, according to Equation (3) in the above-described interference source hunting method. The interference source hunting robot 1 overlays (for example, multiplies) the presence probabilities of the AP calculated this time on the respective presence probabilities of the AP of the small areas obtained by calculation at measurement point 1 (i.e., the AP presence probability table P1), to update the presence probabilities of the AP of the respective small areas. In this way, each presence probability is weighted depending on whether the small area is located inside or outside the circular area C2, and the presence probability of the AP in each small area is updated.

Next, the interference source hunting robot 1 moves by a predetermined distance in a direction of another small area having a higher presence probability of the AP than that of the small area including measurement point 2, which is the current position. The interference source hunting robot 1 determines the position after the move, to be measurement point 3, which is the third measurement point.

As illustrated in FIG. 3(C), the interference source hunting robot 1 then receives electromagnetic waves at measurement point 3, which is the third measurement point, to measure a radio field strength, wavelength, and the like, to hunt for the AP.

The interference source hunting robot 1 uses the values of the measured radio field strength and wavelength to perform calculation according to Equation (2) in the above-described interference source hunting method, and obtains a distance $d_3$, which is the distance from measurement point 3 to a position where the AP is estimated to be present. FIG. 3(C) illustrates a positional relationship between the hunting-target area AR1 and a circular area C3 having a radius of the distance $d_3$ with the center at measurement point 3.

Next, the interference source hunting robot 1 calculates, in a similar manner to that at measurement point 1 and measurement point 2, a presence probability of the AP for each of multiple small areas obtained by sectioning the hunting-target area AR1 in a mesh pattern, according to Equation (3) in the above-described interference source hunting method. The interference source hunting robot 1 overlays (for example, multiplies) the presence probabilities of the AP calculated this time on the respective presence probabilities of the AP of the small areas updated based on the calculation at measurement point 2, to further update the presence probabilities of the AP of the respective small areas. As a result, an updated AP presence probability table P3 as that illustrated in FIG. 4(B) is obtained. In this way, each presence probability is weighted depending on whether the small area is located inside or outside the circular area C3, and the presence probability of the AP in each small area is further updated.

By repeating such update of the presence probabilities of the AP in the respective small areas, for example, as illustrated in FIG. 4(B), an AP presence probability table (update result of presence probabilities of the AP) is obtained, in which the presence probabilities of the AP increase in the order of: each small area located outside the circular area C1<each small area located inside the circular area C1 while being located outside the circular area C2 and the circular area C3<each small area located inside the circular area C1 and the circular area C2 while being located outside C3<each small area located inside the circular area C1, the circular area C2, and the circular area C3.

For example, as in the example above, the presence probability of the AP in a case of performing hunting for an interference source at three positions, i.e., measurement point 1, measurement point 2, and measurement point 3 can be expressed as in Equation (6) below.

[Math. 6]

[Math. 6]

$$P_{1\_3}(x, y, z) = \frac{S_{meas1}P_1(x, y, z) + S_{meas2}P_2(x, y, z) + S_{meas3}P_3(x, y, z)}{S_{meas1} + S_{meas2} + S_{meas3}} \quad (6)$$

In this way, the interference source hunting robot 1 repeats hunting for the location of the AP while moving in a direction with a high presence probability of the AP, to thereby identify the location of the AP.

Note that, according to the above-described interference source hunting method, in a case where an interference source (AP) uses a directional antenna, the received power is low in the directions other than the direction in which the directional antenna is directed, and this reduces the weight in the above-described weighting. This further increases the accuracy in interference source hunting. Furthermore, according to the above-described interference source hunting method, it is possible to minimize an influence of accidental reduction of received power due to an influence of multipath and the like.

Procedure of Interference Source Hunting Processing

Hereinafter, the procedure of interference source hunting processing by the interference source hunting robot 1 will be described.

Figure 5:
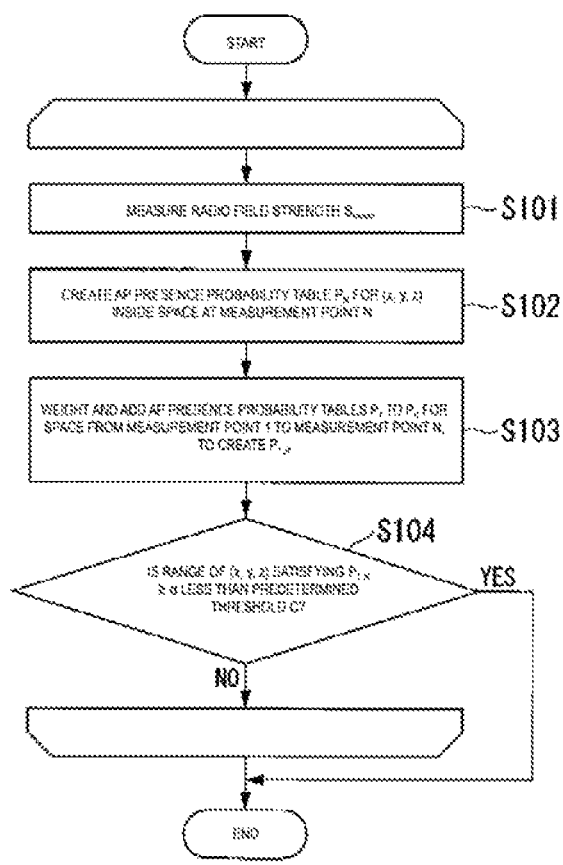
FIG. 5 is a flowchart illustrating a procedure of interference source hunting processing by the interference source hunting robot according to the first embodiment of the present disclosure.

FIG. 5 is a flowchart illustrating the procedure of the interference source hunting processing by the interference source hunting robot 1 according to the first embodiment of the present invention.

At measurement point n (n=1 to N, N: natural number), the radio wave measuring unit 3 of the interference source hunting robot 1 measures a radio field strength $S_{measn}$ via the antenna 30 (step S101). The radio wave measuring unit 3 outputs strength information indicating the measured radio field strength $S_{measn}$ to the strength information acquiring unit 51 of the self-traveling route control unit 5.

The strength information acquiring unit 51 of the self-traveling route control unit 5 acquires the strength information output from the radio wave measuring unit 3. The distance estimating unit 52 estimates the distance from measurement point n (n=1 to N, N: natural number) to an interference source, based on the strength information and propagation losses. The presence probability calculating unit 53 of the self-traveling route control unit 5 creates an AP presence probability table $P_N$ for (x, y, z) inside the space at measurement point N, based on whether each hunting-target position is within a distance (step S102).

The presence probability update unit 54 of the self-traveling route control unit 5 performs weighting and addition on the AP presence probability tables $P_1$ to $P_N$ for the inside of the spaces at respective measurement point 1 to measurement point N, to create an AP presence probability table $P_{1\_N}$ (step S103).

The determining unit 55 of the self-traveling route control unit 5 determines whether the range of (x, y, z) satisfying $P_{1\_N} \geq \alpha$ is less than the predetermined threshold C (step S104).

In a case where the range of (x, y, z) satisfying $p_{1\_N} \geq \alpha$ is not less than the predetermined threshold C (i.e., greater than or equal to the predetermined threshold value C) (step S104, No), the measurement point determining unit 56 of the self-traveling route control unit 5 determines, as a new measurement point, a position obtained by moving the measurement point by a predetermined distance in a direction having a higher presence probability of the AP than the presence probability at the measurement point corresponding to the current position. The drive unit 6 of the interference source hunting robot 1 moves the interference source hunting robot 1 to the new measurement point determined by the measurement point determining unit 56. The interference source hunting robot 1 repeats the processing from step S101 to step S104 above.

In a case where the range of (x, y, z) satisfying $P_{1\_N} \geq \alpha$ is less than the predetermined threshold C (step S104, Yes), the determining unit 55 identifies the location of the interference source (AP), based on the presence probabilities of the AP in the AP presence probability table $P_{1\_N}$. After the above, the processing of the flowchart illustrated in FIG. 5 is terminated.

Second Embodiment

Hereinafter, a second embodiment of the present invention will be described with reference to drawings.

Figure 6:
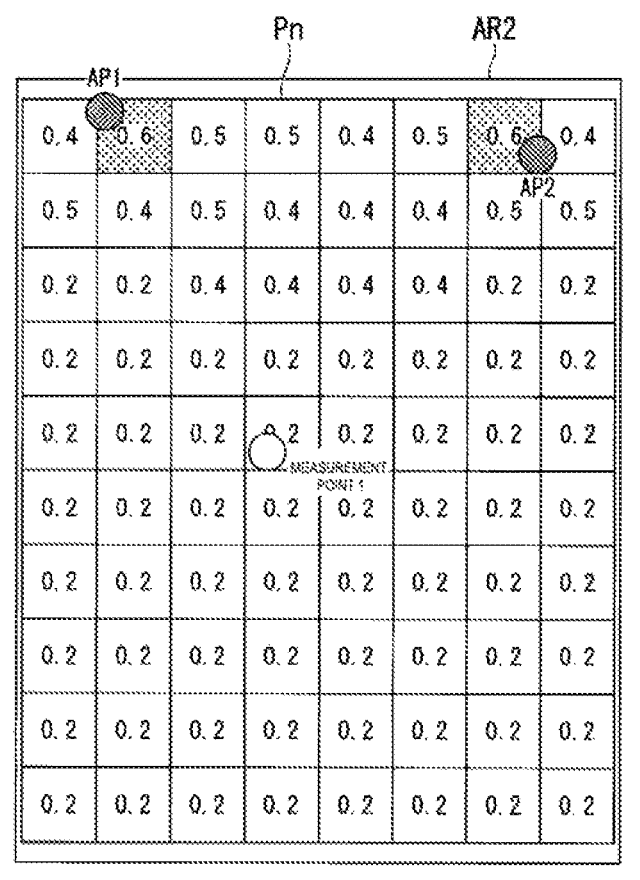

In the above-described first embodiment, a case in which the number of interference sources (APs) in the hunting-target area AR1 is one is described as an example. In practice, however, there may be multiple interference sources within a hunting-target area. In the second embodiment, the interference source hunting robot 1 hunts for locations of multiple respective interference sources that are present in a hunting-target area. FIG. 6 illustrates a schematic diagram illustrating an example of a hunting-target area AR2, in which two interference sources (AP1 and AP2) are present, and an AP presence probability table $P_n$ created as a result of interference source hunting processing for the hunting-target area AR2 by the interference source hunting robot 1.

For example, in a case where the interference source hunting processing according to the first embodiment is performed on a hunting-target area in which multiple interference sources are present, such as the hunting-target area AR2, the interference source hunting robot 1 may move, as moving closer to a particular interference source, away from the other interference source. This consequently reduces the value of the presence probability of the other interference source.

Specifically, for example, as illustrated in FIG. 6, in the case where two interference sources (AP1 and AP2) are present in the hunting-target area AR2, and the interference source hunting robot 1 hunts for a position of the AP2, the presence probabilities of AP1 decrease in the AP presence probability table $P_n$ as the interference source hunting robot 1 moves closer to AP2, for example. As a result, only one interference source (AP2) can be detected although the two interference sources are present.

In the second embodiment, in a case where multiple small areas each having a presence probability of an AP exceeding a predetermined threshold in the updated AP presence probability table $P_n$ and the distance between the small areas is greater than or equal to a predetermined length, the interference source hunting robot 1 duplicates and holds the AP presence probability table $P_n$ for the number of the multiple small areas.

Note that the above-described prescribed threshold for the presence probability of the AP is, for example, "0.6" or the like in the AP presence probability table $P_n$ illustrated in FIG. 6.

The interference source hunting robot 1 performs the interference source hunting processing on each of multiple small areas by using the corresponding one of the AP presence probability tables $P_n$ duplicated for the multiple respective small areas.

Note that, for example, a MAC address, an SSID, a signal modulation scheme, a spectrum shape, and the like can be used as information for identifying each of the multiple existing interference sources, but the configuration of identifying each interference source, based only on power information may be employed.

Procedure of Interference Source Hunting Processing

Hereinafter, the procedure of interference source hunting processing by the interference source hunting robot 1 will be described.

Figure 7:
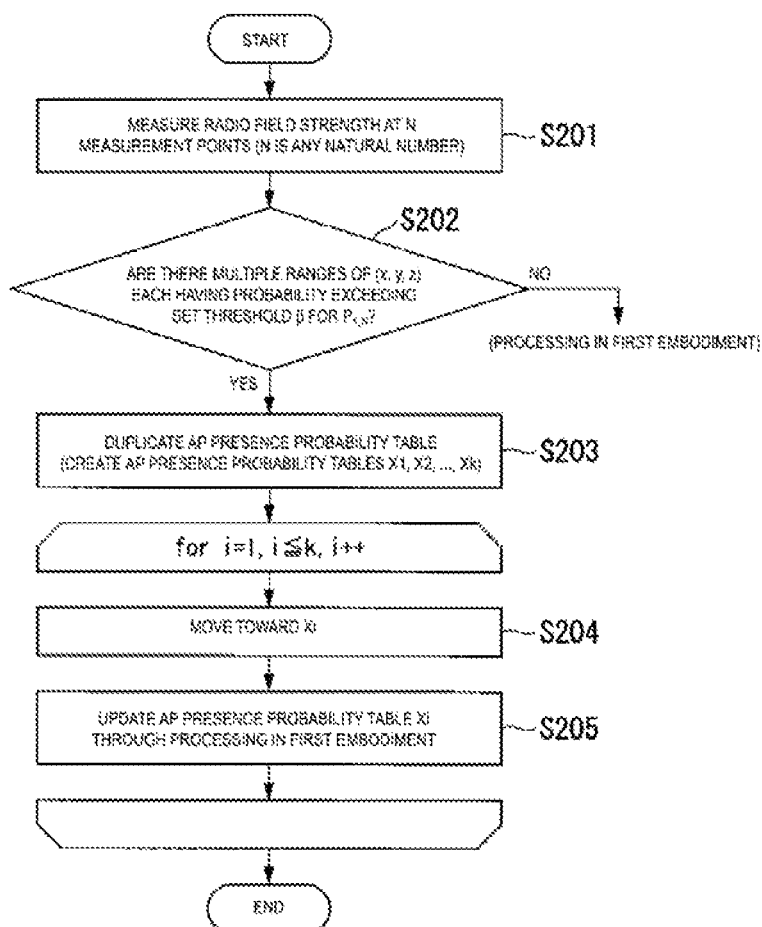
FIG. 7 is a flowchart illustrating a procedure of the interference source hunting processing by the interference source hunting robot according to the second embodiment of the present disclosure.

FIG. 7 is a flowchart illustrating a procedure of the interference source hunting processing by the interference source hunting robot 1 according to the second embodiment of the present invention.

The interference source hunting robot 1 performs measurement of radio wave strengths at N respective measurement points (N is any natural number) (step S201). Note that any route may be taken as a moving route of the interference source hunting robot 1 moving to N measurement points.

The interference source hunting robot 1 creates an AP presence probability table $P_{1\_N}$, based on measurement of the radio wave strengths at N measurement points. The interference source hunting robot 1 determines whether multiple small areas each having a presence probability exceeding a threshold β are present in the created AP presence probability table $P_{1\_N}$ (step S202). Note that, instead of determination being based on the number of small areas each having a presence probability exceeding the threshold value β, it may be configured that determination is based on the number of points each having a presence probability exceeding the threshold value β.

In a case where no multiple small areas each having a presence probability exceeding the threshold β (i.e., a case of one or zero) are present (step S202, No), the interference source hunting robot 1 performs the interference source hunting processing according to the first embodiment described by using FIG. 5 (step S101 to step S104 in FIG. 6).

In a case where multiple small areas each having a presence probability exceeding the threshold β (e.g., a case of $X_1$ to $X_k$) are present (step S202, Yes), the interference source hunting robot 1 replicates the AP presence probability table for the number of small areas each having a presence probability exceeding the threshold β (e.g., k). Consequently, AP presence probability tables $X_1, X_2, \ldots,$ and $X_k$ are generated (step S203).

The interference source hunting robot 1 first moves by a predetermined distance in a direction of $X_1$ by using the AP presence probability table $X_1$ (step S204).

The interference source hunting robot 1 performs, for $X_1$, the interference source hunting processing according to the first embodiment described by using FIG. 5 (step S101 to step S104 in FIG. 6), to update the AP presence probability table $X_1$ (step S205). In this way, the location of the interference source (AP) corresponding to $X_1$ is identified.

The interference source hunting robot 1 sequentially performs, similarly to $X_1$, the processing in step S204 and step S205 for $X_2$ to $X_5$. In this way, the locations of the respective interference sources (APs) corresponding to $X_2$ to $X_5$ are also identified.

After the above, the processing in the flowchart illustrated in FIG. 7 is terminated.

Third Embodiment

Hereinafter, a third embodiment of the present invention will be described with reference to drawings.

Figure 8:
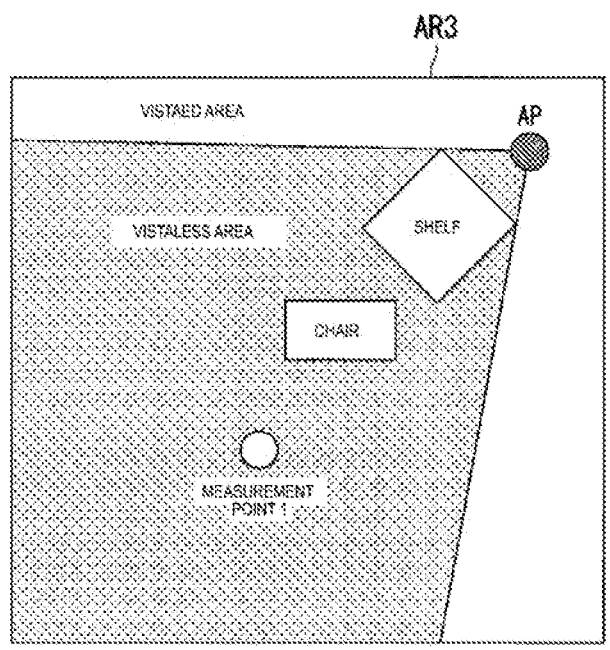
FIG. 8 is a schematic diagram illustrating an example of a hunting-target area in which obstacles are present.

In many cases, obstacles are present in an actual hunting-target area. FIG. 8 illustrates a schematic diagram illustrating an example of a hunting-target area in which obstacles are present. As illustrated in FIG. 8, a shelf and a chair that are obstacles in propagation of electromagnetic waves are placed in a hunting-target area AR3. In a case where electromagnetic waves are transmitted from an AP, positions at which neither of the obstacles are present to the AP correspond to a vistaed area, whereas positions at which the AP is hidden behind the shelf correspond to a vistaless area.

In the third embodiment, the interference source hunting robot 1 detects obstacle information and estimates a propagation environment. In the vistaless area, the reliability of radio wave measurement is low due to a multipath environment and the like. The interference source hunting robot 1 recognizes that the current measurement point is in a multipath environment, based on the current measurement point being in a vistaless area and/or being surrounded by many obstacles. In this case, the interference source hunting robot 1 performs processing of reducing a weight for weighting calculation of a presence probability of the AP at the current measurement point.

Note that conceivable examples of a method of determining whether the current measurement point is in a multipath environment include a determining method using radio wave information and a determining method not using radio wave information. In the determining method using radio wave information, for example, a delay profile and the like are obtained, to make a determination as to whether the current measurement point is in a multipath environment. Alternatively, radio wave strengths are measured at multiple measurement points, to make a determination as to whether the current measurement point is in a multipath environment, based on a correlation between the radio wave strengths of the measurement points. In the determining method not using radio wave information, for example, a determination is made about presence of obstacles, such as a wall and furniture, by using a camera or a laser range finder, and the current measurement point is determined to be in a multipath environment in a case where the number of detected obstacles is greater than or equal to a predetermined number, or in a case where an obstacle is detected within a predetermined distance.

Note that, in a multipath environment, power values are often higher or lower than expected. In this case, by reducing the value of the probability p and increasing the value of the probability q in the determination condition in Equation (3) described above, processing for increasing the number of measurement points required to identify an interference source is performed, and processing for ensuring reliability is performed.

Procedure of Interference Source Hunting Processing

Hereinafter, the procedure of interference source hunting processing by the interference source hunting robot 1 will be described.

Figure 9:
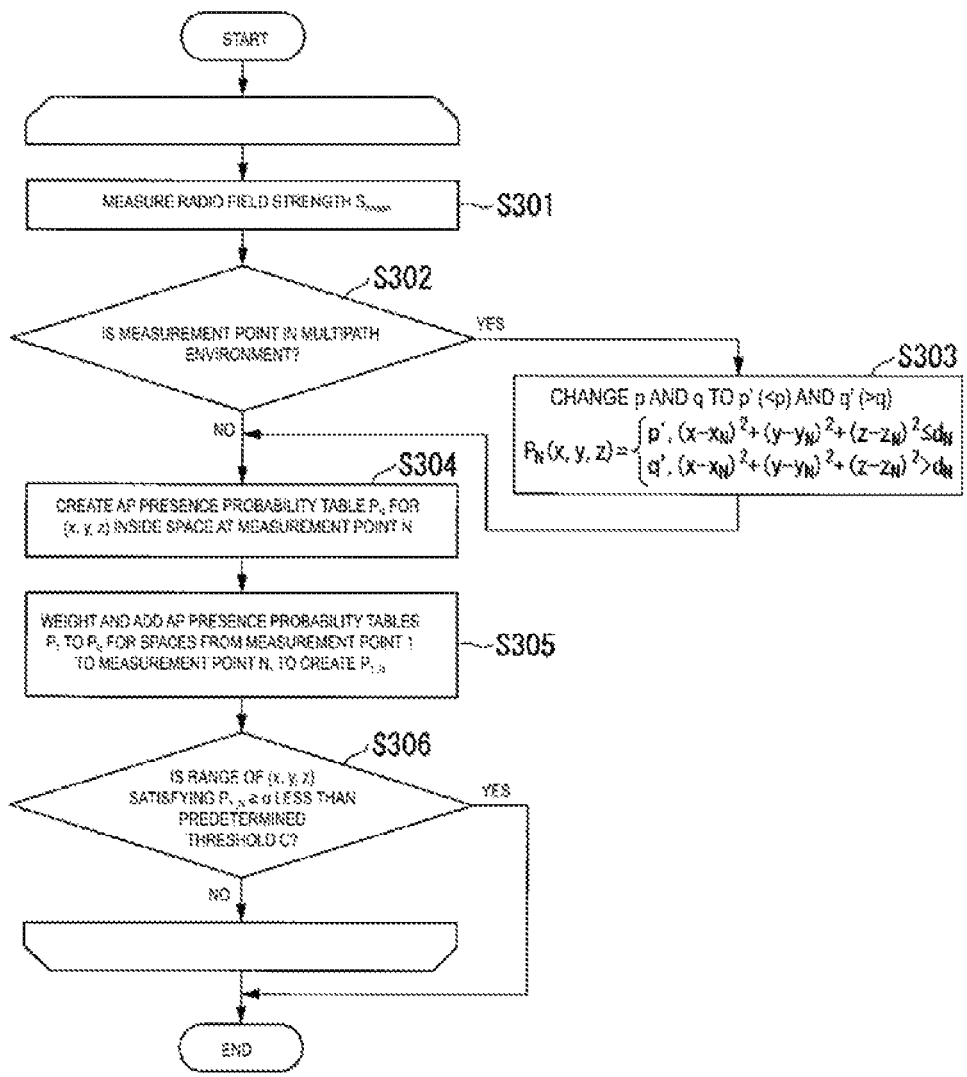
FIG. 9 is a flowchart illustrating a procedure of interference source hunting processing by an interference source hunting robot according to a third embodiment of the present disclosure.

FIG. 9 is a flowchart illustrating a procedure of interference source hunting processing by the interference source hunting robot 1 according to the third embodiment of the present invention.

At measurement point n (n=1 to N, N: natural number), the radio wave measuring unit 3 of the interference source hunting robot 1 measures a radio field strength $S_{measn}$ via the antenna 30 (step S301). The radio wave measuring unit 3 outputs strength information indicating the measured radio field strength $S_{measn}$ to the strength information acquiring unit 51 of the self-traveling route control unit 5.

The strength information acquiring unit 51 of the self-traveling route control unit 5 acquires the strength information output from the radio wave measuring unit 3. The distance estimating unit 52 estimates the distance from measurement point n (n=1 to N, N: natural number) to an interference source, based on the strength information and propagation losses.

The presence probability calculating unit 53 of the self-traveling route control unit 5 determines whether current measurement point n (n=1 to N, N: natural number) is in a multipath environment (step S302). In a case where current measurement point n (n=1 to N, N: natural number) is in a multipath environment (step S302, Yes), the self-traveling route control unit 5 reduces the value of the probability p and increases the value of the probability q in the calculation of the presence probabilities of the AP according to Equation (3) above to calculate the presence probability of the AP (i.e., in Equation (3) above for calculating the presence probability of the AP, changes the values of p and q to p' (<p) and q' (>q), respectively) (step S303).

The presence probability calculating unit 53 of the self-traveling route control unit 5 creates an AP presence probability table $P_N$ for (x, y, z) inside the space at measurement point N, based on whether each hunting-target position is within a distance (step S304).

The presence probability update unit 54 of the self-traveling route control unit 5 performs weighting and addition on the AP presence probability tables $P_1$ to $P_N$ for the inside of the spaces at respective measurement point 1 to measurement point N, to create an AP presence probability table $P_{1\_N}$ (step S305).

The determining unit 55 of the self-traveling route control unit 5 determines whether the range of (x, y, z) satisfying $P_{1\_N} \geq \alpha$ is less than the predetermined threshold C (step S306).

In a case where the range of (x, y, z) satisfying $p_{1\_N} \geq \alpha$ is not less than the predetermined threshold C (i.e., greater than or equal to the predetermined threshold value C) (step S306, No), the measurement point determining unit 56 of the self-traveling route control unit 5 determines, as a new measurement point, a position obtained by moving the measurement point by a predetermined distance in a direction having a higher presence probability of the AP than the presence probability at the measurement point corresponding to the current position. The drive unit 6 of the interference source hunting robot 1 moves the interference source hunting robot 1 to the new measurement point determined by the measurement point determining unit 56. The interference source hunting robot 1 repeats the processing from step S101 to step S104 above.

In a case where the range of (x, y, z) satisfying $P_{1\_N} \geq \alpha$ is less than the predetermined threshold C (step S306, Yes), the determining unit 55 identifies the location of the interference source (AP), based on the presence probabilities of the AP in the AP presence probability table $P_{1\_N}$. After the above, the processing of the flowchart illustrated in FIG. 9 is terminated.

Fourth Embodiment

In addition to the configuration of the interference source hunting method according to the first embodiment, a configuration of identifying the location of an interference source (AP) by using image data and/or shape data of the interference source (AP) may be employed.

For example, the interference source hunting robot 1 holds image data or shape data of an apparatus of an interference source (AP) in advance. The interference source hunting robot 1 then captures an image in the direction in which the interference source is estimated to be present, by a camera or the like at each of the measurement points. The interference source hunting robot 1 compares the image data or shape data of an object obtained by the image capturing, with the image data or shape data of the apparatus of the interference source (AP) held in advance, to determine whether the captured object is the apparatus of the interference source (AP). This allows the interference source hunting robot 1 to identify the location of the interference source (AP) faster.

Procedure of Interference Source Hunting Processing

Hereinafter, the procedure of interference source hunting processing by the interference source hunting robot 1 will be described.

Figure 10:
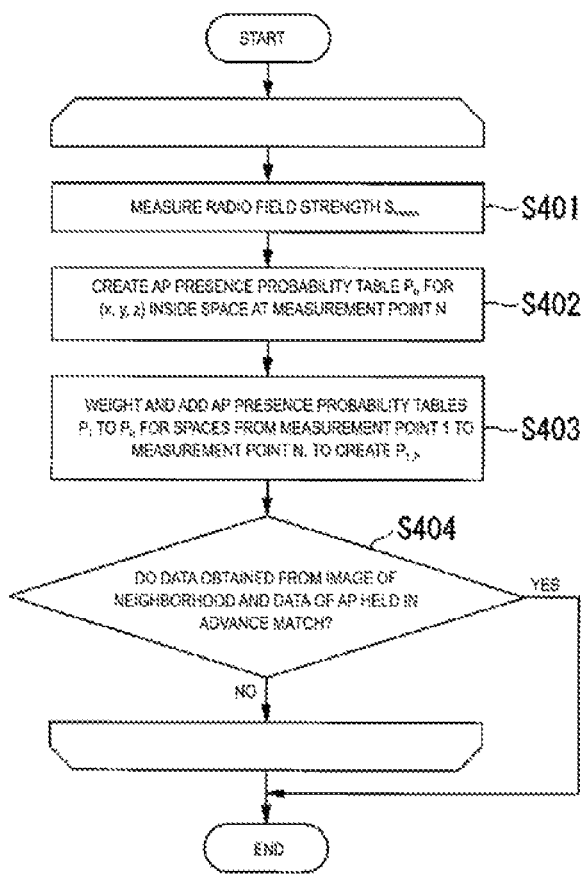
FIG. 10 is a flowchart illustrating a procedure of interference source hunting processing by an interference source hunting robot according to a fourth embodiment of the present disclosure.

FIG. 10 is a flowchart illustrating a procedure of the interference source hunting processing by the interference source hunting robot 1 according to the fourth embodiment of the present invention.

At measurement point n (n=1 to N, N: natural number), the radio wave measuring unit 3 of the interference source hunting robot 1 measures a radio field strength $S_{measn}$ via the antenna 30 (step S401). The radio wave measuring unit 3 outputs strength information indicating the measured radio field strength $S_{measn}$ to the strength information acquiring unit 51 of the self-traveling route control unit 5.

The strength information acquiring unit 51 of the self-traveling route control unit 5 acquires the strength information output from the radio wave measuring unit 3. The distance estimating unit 52 estimates the distance from measurement point n (n=1 to N, N: natural number) to an interference source, based on the strength information and propagation losses. The presence probability calculating unit 53 of the self-traveling route control unit 5 creates an AP presence probability table $P_n$ for (x, y, z) inside the space at measurement point n, based on whether each hunting-target position is within a distance (step S402).

The presence probability update unit 54 of the self-traveling route control unit 5 performs weighting and addition on the AP presence probability tables $P_1$ to $P_N$ for the inside of the spaces at respective measurement point 1 to measurement point N, to create an AP presence probability table $P_{1\_N}$ (step S403).

The determining unit 55 of the self-traveling route control unit 5 acquires data obtained from the image around the current measurement point n (n=1 to N, N: natural number) (for example, image data or shape data of an object) via the topographical-feature/obstacle/position detecting sensor unit 2 and the measurement-data/coordinate record unit 4. The determining unit 55 also acquires data relating to the apparatus of the interference source (AP) (for example, image data or shape data of the apparatus) stored in advance in the measurement-data/coordinate record unit 4. The determining unit 55 compares the data obtained from the image around the current measurement point n (n=1 to N, N: natural number) with the data relating to the apparatus of the interference source (AP), and determines whether the data match (step S404).

In a case where the data obtained from the image around the current measurement point n (n=1 to N, N: natural number) and the data relating to the apparatus of the interference source (AP) do not match (step S404, No), the measurement point determining unit 56 of the self-traveling route control unit 5 determines, as a new measurement point, a position obtained by moving the measurement point by a predetermined distance in a direction having a higher presence probability of the AP than the presence probability at the measurement point corresponding to the current position. The drive unit 6 of the interference source hunting robot 1 moves the interference source hunting robot 1 to the new measurement point determined by the measurement point determining unit 56. The interference source hunting robot 1 repeats the processing from step S401 to step S404 above.

In a case where the data obtained from the image around the current measurement point n (n=1 to N, N: natural number) and the data related to the apparatus of the interference source (AP) match (step S404, Yes), the determining unit 55 determines that the data obtained from the image around the current measurement point n (n=1 to N, N: natural number) corresponds to the apparatus of the hunting-target interference source (AP) and accordingly identifies the location of the interference source (AP). After the above, the processing in the flowchart illustrated in FIG. 10 is terminated.

Fifth Embodiment

In a case of hunting for an interference source, in practice, electromagnetic waves may be blocked by an obstacle and the like, and this may prevent the location (direction) of the interference source (AP) from being correctly estimated. For example, in a case where electromagnetic waves transmitted from the AP are reflected from a wall or the like, the reflecting point may be falsely detected as the location of the AP.

Figure 11:
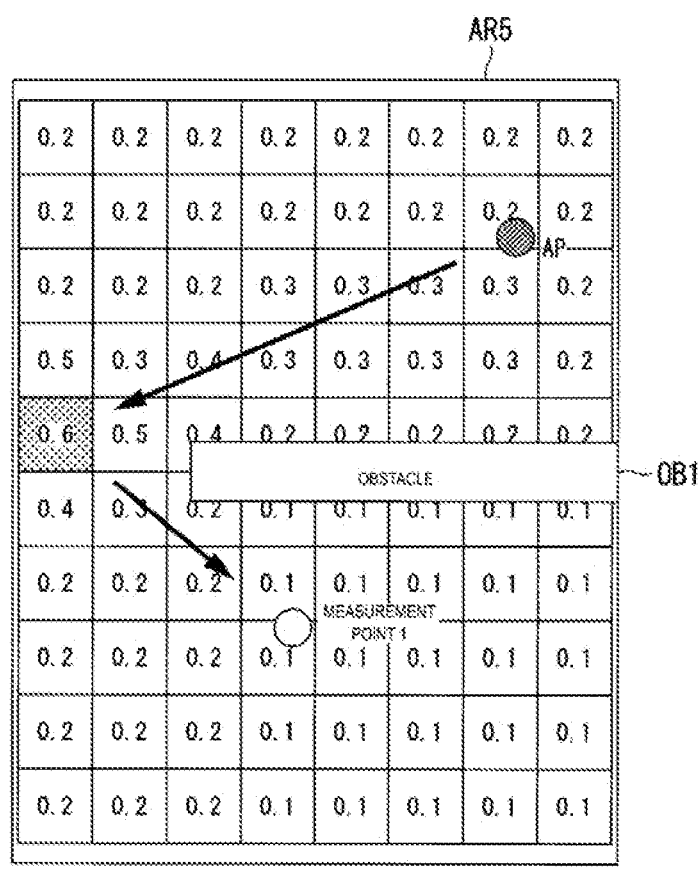
FIG. 11 is a schematic diagram illustrating an example of a hunting-target area in which an obstacle is present.

FIG. 11 illustrates a schematic diagram illustrating an example of a hunting-target area in which an obstacle is present. As illustrated in FIG. 11, an obstacle OB 1 is present between measurement point 1 and an AP in a hunting-target area AR5. Although the presence probability of the AP normally increases as a measurement point is positioned closer to the location where the AP is present, the obstacle OB 1 is present in the hunting-target area AR5, and hence electromagnetic waves linearly heading for measurement point 1 from the AP are blocked by the obstacle OB 1. As a result of this, the value of the presence probability in the AP presence probability table remains small even near the location where the AP is present. In contrast, electromagnetic waves reaching from the AP to measurement point 1 are reflected from the wall and are hence not blocked by the obstacle OB 1. This increases the presence probability of the AP at the position of the reflecting point at the wall ("0.6" in FIG. 11, which is the highest presence probability of the AP in the hunting-target area AR5).

In a case where the interference source hunting robot 1 moves in the direction in which the AP is estimated to be present, the presence probability at the correct location of the AP normally increases with higher weighting, and this decreases the probability of false detection, as the number of measurement points increases. However, in some positional relationships of the interference source hunting robot 1, the AP, and the obstacle, the interference source hunting robot 1 moves linearly from measurement point 1 to measurement point N, e.g., in the direction toward the reflecting point of the wall. Then, the interference source hunting processing may be terminated before visibility is ensured, in a state where the position of the reflecting point is falsely detected as the location of the AP.

The interference source hunting robot 1 according to the fifth embodiment avoids such false detection described above. The interference source hunting robot 1 holds positional information of a wall surface, an obstacle, and the like in advance. In a case of moving in a direction in which the presence probability of the AP is higher and resulting in linear moving, the interference source hunting robot 1 considers the possibility of reflection, based on the relationship of the position of the measurement point, the location at which the AP is estimated to be present, and the position of the obstacle. Specifically, the interference source hunting robot 1 changes, at the position on the other side of the position of the obstacle, the moving route in a direction away from the location where the AP is estimated to be present (e.g., which may be a reflecting point of the wall).

For example, the interference source hunting robot 1 draws lines satisfying a relationship between an incident angle and a reflection angle with respect to a wall surface, with a line connecting the position (x, y, z) where the presence probability of the AP is the highest and the current measurement point $(x_n, y_n, z_n)$, as an incident direction. The interference source hunting robot 1 determines that the position (x, y, z) may be a reflecting point, in a case where a point on the line drawn at the reflection angle and the measurement point are connected by a straight line and the position of the detected obstacle is between the points.

Procedure of Interference Source Hunting Processing

Hereinafter, the procedure of interference source hunting processing by the interference source hunting robot 1 will be described.

Figure 12:
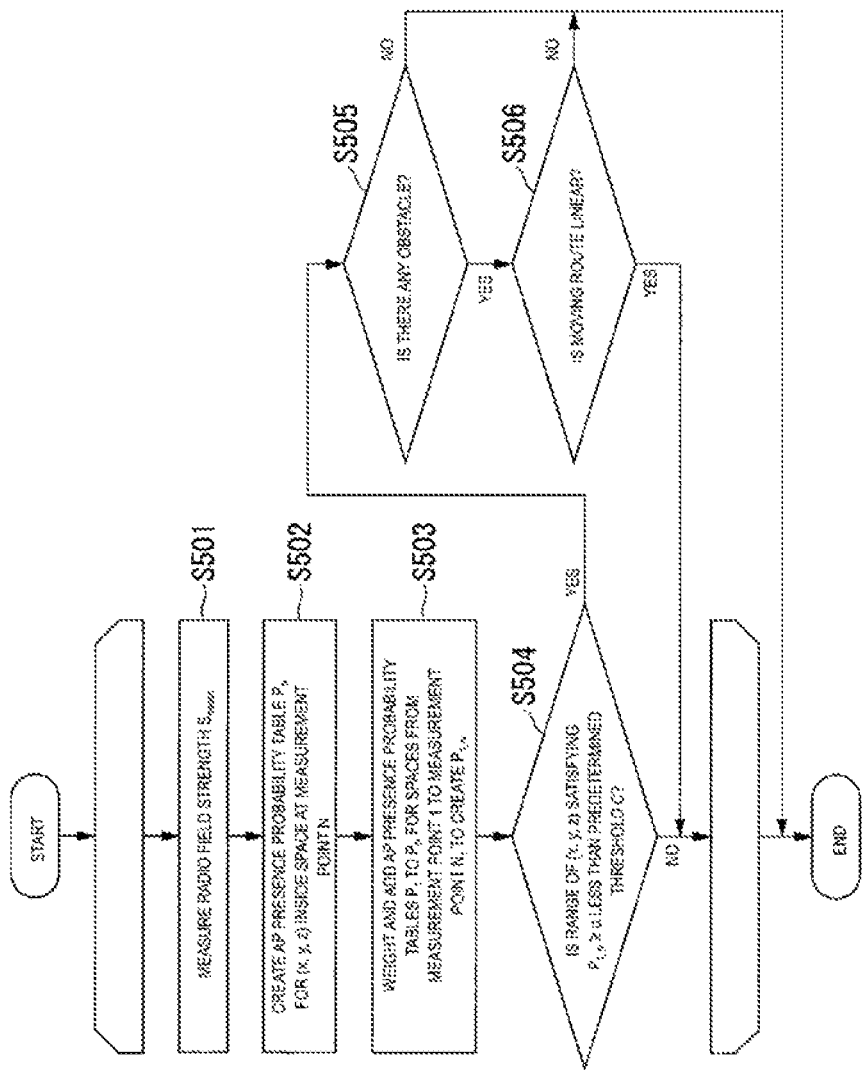
FIG. 12 is a flowchart illustrating a procedure of interference source hunting processing by an interference source hunting robot according to a fifth embodiment of the present disclosure.

FIG. 12 is a flowchart illustrating a procedure of the interference source hunting processing by the interference source hunting robot 1 according to the fifth embodiment of the present invention.

At measurement point n (n=1 to N, N: natural number), the radio wave measuring unit 3 of the interference source hunting robot 1 measures a radio field strength $S_{measn}$ via the antenna 30 (step S501). The radio wave measuring unit 3 outputs strength information indicating the measured radio field strength $S_{measn}$ to the strength information acquiring unit 51 of the self-traveling route control unit 5.

The strength information acquiring unit 51 of the self-traveling route control unit 5 acquires the strength information output from the radio wave measuring unit 3. The distance estimating unit 52 estimates the distance from measurement point n (n=1 to N, N: natural number) to an interference source, based on the strength information and propagation losses. The presence probability calculating unit 53 of the self-traveling route control unit 5 creates an AP presence probability table $P_N$ for (x, y, z) inside the space at measurement point N, based on whether each hunting-target position is within a distance (step S502).

The presence probability update unit 54 of the self-traveling route control unit 5 performs weighting and addition on the AP presence probability tables $P_1$ to $P_N$ for the inside of the spaces at respective measurement point 1 to measurement point N, to create an AP presence probability table $P_{1\_N}$ (step S503).

The determining unit 55 of the self-traveling route control unit 5 determines whether the range of (x, y, z) satisfying $P_{1\_N} \geq \alpha$ is less than the predetermined threshold C (step S504).

In a case where the range of (x, y, z) satisfying $p_{1\_N} \geq \alpha$ is not less than the predetermined threshold C (i.e., greater than or equal to the predetermined threshold value C) (step S504, No), the measurement point determining unit 56 of the self-traveling route control unit 5 determines, as a new measurement point, a position obtained by moving the measurement point by a predetermined distance in a direction having a higher presence probability of the AP than the presence probability at the measurement point corresponding to the current position. The drive unit 6 of the interference source hunting robot 1 moves the interference source hunting robot 1 to the new measurement point determined by the measurement point determining unit 56. The interference source hunting robot 1 repeats the processing from step S501 to step S504 above.

In a case where the range of (x, y, z) satisfying $P_{1\_N} \geq \alpha$ is less than the predetermined threshold C (step S504, Yes), the determining unit 55 determines whether there is any obstacle in the neighborhood (step S505). In a case where the determining unit 55 determines that there is an obstacle in the neighborhood (step S505, Yes), the determining unit 55 determines whether the moving route in the interference source hunting until then is a linear route (step S506).

In a case where the determining unit 55 determines that the moving route in the interference source hunting until then is a linear route (step S506, Yes), the measurement point determining unit 56 of the self-traveling route control unit 5 determines, as a new measurement point, a position obtained by moving the measurement point by a predetermined distance in a direction having a higher presence probability of the AP than the presence probability at the measurement point corresponding to the current position. The drive unit 6 of the interference source hunting robot 1 moves the interference source hunting robot 1 to the new measurement point determined by the measurement point determining unit 56. The interference source hunting robot 1 repeats the processing from step S501 to step S504 above.

In a case where the determining unit 55 determines that there is no obstacle in the neighborhood (step S505, No) or determines that the moving route in the interference source hunting until then is not a linear route (step S506, No), the location of the interference source (AP) is identified based on the presence probability of the AP in the AP presence probability table $P_{1\_N}$. After the above, the processing in the flowchart illustrated in FIG. 12 is terminated.

Sixth Embodiment

In a case of performing hunting for an interference source, in practice, moving objects such as a person, an animal, and a vehicle may be present in a hunting-target area. Electromagnetic waves may be blocked by these moving objects, and this may prevent the location (direction) of an interference source (AP) from being correctly estimated.

In a sixth embodiment, in a case of detecting that the interference source hunting robot 1 determines that a moving object such as a person, an animal, or a vehicle is present in the neighborhood, the interference source hunting robot 1 determines that the reliability of the value of the presence probability of the AP calculated at the current measurement point is low. In this case, the interference source hunting robot 1, similarly to the third embodiment described above, performs processing of reducing a weight for weighting calculation of a presence probability of the AP at the current measurement point. Note that, in this case, the interference source hunting robot 1 may determine the amount of reducing the weight, according to the amount of motion of the moving object in the neighborhood.

Procedure of Interference Source Hunting Processing

Hereinafter, the procedure of interference source hunting processing by the interference source hunting robot 1 will be described.

Figure 13:
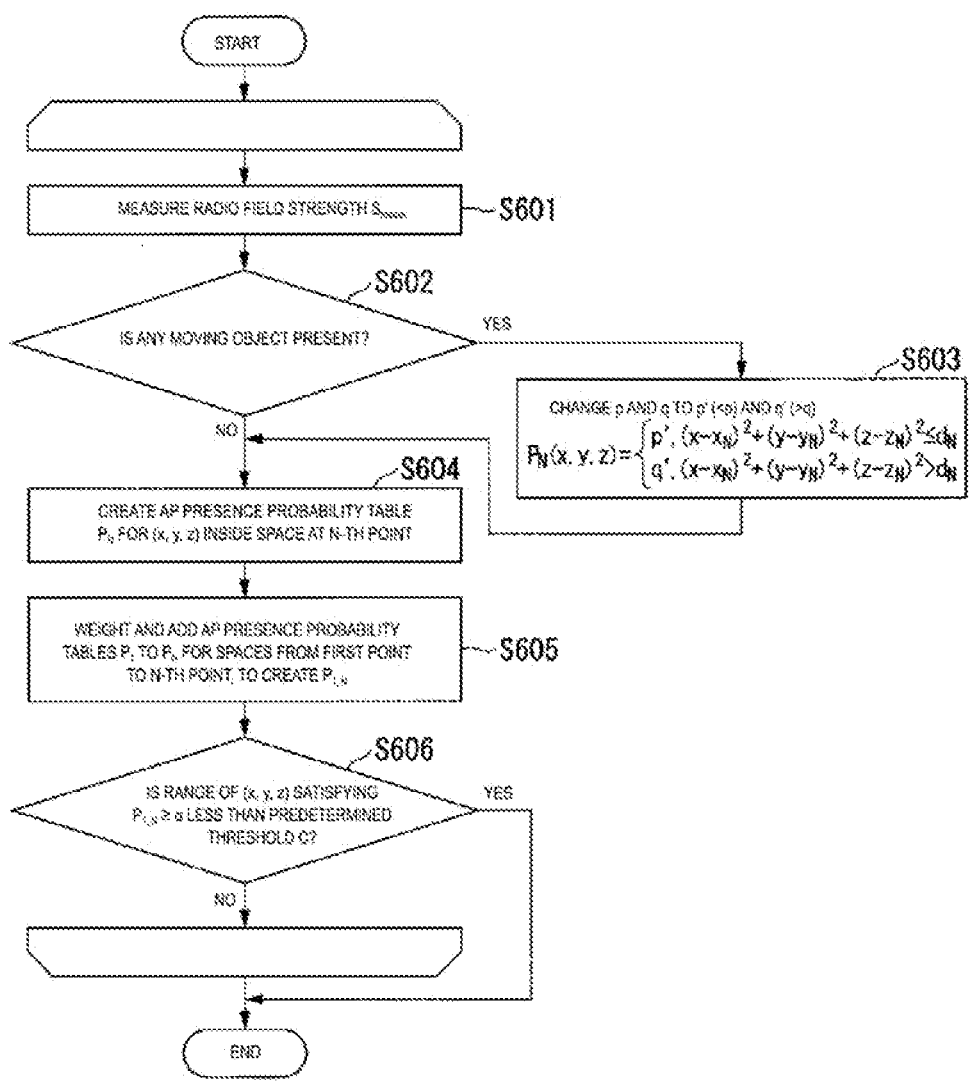
FIG. 13 is a flowchart illustrating a procedure of interference source hunting processing by an interference source hunting robot according to a sixth embodiment of the present disclosure.

FIG. 13 is a flowchart illustrating the procedure of the interference source hunting processing by the interference source hunting robot 1 according to the sixth embodiment of the present invention.

At measurement point n (n=1 to N, N: natural number), the radio wave measuring unit 3 of the interference source hunting robot 1 measures a radio field strength $S_{measn}$ via the antenna 30 (step S601). The radio wave measuring unit 3 outputs strength information indicating the measured radio field strength $S_{measn}$ to the strength information acquiring unit 51 of the self-traveling route control unit 5.

The presence probability calculating unit 53 of the self-traveling route control unit 5 determines whether any moving object such as a person, an animal, or a vehicle is present in the neighborhood of current measurement point n (n=1 to N, N: natural number) (step S602). In a case where a moving object is present in the neighborhood of current measurement point n (n=1 to N, N: natural number) (step S602, Yes), the self-traveling route control unit 5 reduces the value of the probability p and increases the value of the probability q in the calculation of the presence probability of the AP in Equation (3) above, to calculate the presence probabilities of the AP (i.e., in Equation (3) above for calculating the presence probabilities of the AP, changes the values of p and q to p' (<p) and q' (>q), respectively) (step S603).

The strength information acquiring unit 51 of the self-traveling route control unit 5 acquires strength information output from the radio wave measuring unit 3. The distance estimating unit 52 estimates the distance from measurement point n (n=1 to N, N: natural number) to an interference source, based on the strength information and propagation losses. The presence probability calculating unit 53 of the self-traveling route control unit 5 creates an AP presence probability table $P_N$ for (x, y, z) inside the space at measurement point N, based on whether each hunting-target position is within a distance (step S604).

The presence probability update unit 54 of the self-traveling route control unit 5 performs weighting and addition on the AP presence probability tables $P_1$ to $P_N$ for the inside of the spaces at respective measurement point 1 to measurement point N, to create the AP presence probability table $P_{1\_N}$ (step S605).

The determining unit 55 of the self-traveling route control unit 5 determines whether the range of (x, y, z) satisfying $P_{1\_N} \geq \alpha$ is less than the predetermined threshold C (step S606).

In a case where the range of (x, y, z) satisfying $p_{1\_N} \geq \alpha$ is not less than the predetermined threshold C (i.e., greater than or equal to the predetermined threshold value C) (step S606, No), the measurement point determining unit 56 of the self-traveling route control unit 5 determines, as a new measurement point, a position obtained by moving the measurement point by a predetermined distance in a direction having a higher presence probability of the AP than the presence probability at the measurement point corresponding to the current position. The drive unit 6 of the interference source hunting robot 1 moves the interference source hunting robot 1 to the new measurement point determined by the measurement point determining unit 56. The interference source hunting robot 1 repeats the processing from step S601 to step S606 above.

In a case where the range of (x, y, z) satisfying $P_{1\_N} \geq \alpha$ is less than the predetermined threshold C (step S606, Yes), the determining unit 55 identifies the location of the interference source (AP), based on the presence probabilities of the AP in the AP presence probability table $P_{1\_N}$. After the above, the processing in the flowchart illustrated in FIG. 13 is terminated.

Note that the self-traveling route control unit 5 in each of the above-described embodiments can be implemented, for example, by a computer and a program. In this case, the computer may be configured to acquire and execute the program recorded on a recording medium, or may be configured to execute the program provided via a network.

All or a part of the interference source hunting robot 1 according to the above-described embodiments may be implemented by a computer. In such a case, part or all of the interference source hunting robot 1 may be implemented by recording a program for implementing their functions in a computer-readable recording medium, and causing a computer system to read and execute the program recorded in the recording medium. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a medium that stores programs dynamically for a short period of time, one example of which is a communication line used in a case where a program is transmitted via a network such as the Internet and a communication line such as a telephone line, and may also include such a medium that stores programs for a certain period of time, one example of which is volatile memory inside a computer system that functions as a server or a client in the above-described case. Further, the above program may be a program for implementing a part of the above-mentioned functions. The above program may be a program capable of implementing the above-mentioned functions in combination with another program already recorded in a computer system. The above program may be a program to be implemented with the use of a programmable logic device such as a field programmable gate array (FPGA).

The embodiments of the present invention have been described above in detail with reference to the drawings. However, specific configurations are not limited to those embodiments, and include any design or the like within the scope not departing from the gist of the present invention.

REFERENCE SIGNS LIST

1 Interference source hunting robot
2 Topographical-feature/obstacle/position detecting sensor unit
3 Radio wave measuring unit
4 Measurement-data/coordinate record unit
5 Self-traveling route control unit
6 Drive unit
7 Measurement result display/output unit
30 Antenna
51 Strength information acquiring unit
52 Distance estimating unit
53 Presence probability calculating unit
54 Presence probability update unit
55 Determining unit
56 Measurement point determining unit

The invention claimed is:

1. An interference source hunting method of hunting for a location of an interference source of electromagnetic waves while moving between multiple measurement points, the multiple measurement points being predetermined positions in a hunting-target area, the interference source hunting method comprising:

a strength information acquiring step of acquiring strength information indicating a strength of the electromagnetic waves at any of the measurement points;

a distance estimating step of estimating a distance from the measurement point to the location of the interference source, based on the strength information and propagation losses;

a presence probability calculating step of calculating, for each position in the hunting-target area, a first presence probability, based on whether a distance from the measurement point to a position in the hunting-target area is within the distance thus estimated, the first presence probability being a probability that the interference source is present at the position;

a presence probability update step of updating second presence probabilities, based on the first presence probabilities, the second presence probabilities being acquired in the hunting in past and being probabilities that the interference source is present at the positions in the hunting-target;

a measurement point determining step of determining a position obtained by moving, by a predetermined distance, the measurement point toward a position in the hunting-target area with the second presence probability higher than the second presence probability at the measurement point, as a new measurement point; and a determining step of determining, in a case where a size of an area based on positions each with the second presence probability thus updated greater than or equal to a predetermined value is less than a predetermined value, that the location of the interference source is within the area.

2. The interference source hunting method according to claim 1, further comprising a table storing step of storing a presence probability table in which the positions in the hunting-target area and the second presence probabilities are associated with each other, wherein in the presence probability update step, the second presence probabilities held in the presence probability table are updated based on the first presence probabilities, and in the measurement point determining step, a position obtained by moving, by the predetermined distance, the measurement point toward a position in the hunting-target area with the second presence probability higher than the second presence probability associated with the measurement point in the presence probability table is determined to be the new measurement point.

3. The interference source hunting method according to claim 1, wherein in the measurement point determining step, in a case where multiple positions each with the second presence probability being higher than the second presence probability at the measurement point in the hunting-target area exist, multiple positions obtained by moving, by a predetermined distance, the measurement point toward the multiple positions in the hunting-target area are determined to be new measurement points.

4. The interference source hunting method according to claim 1, wherein in the presence probability update step, the second presence probability is updated for each position in the hunting-target area, based on the corresponding first presence probability obtained through weighting based on a degree of reliability of the strength information.

5. The interference source hunting method according to claim 1, wherein in the determining step, an image of an object captured at the measurement point and an image held in advance and related to the interference source are compared to determine whether the object is the interference source, and in a case of determining that the object is the interference source, a location of the object is determined to be the location of the interference source.

6. The interference source hunting method according to claim 1, wherein in the determining step, in a case where an obstacle is present in a neighborhood and a path connecting measurement points passed in moving in past is linear, the location of the interference source is not determined to be within the area.

7. The interference source hunting method according to claim 1, wherein in the presence probability update step, in a case where a moving object is present in a neighborhood, the second presence probability is updated for each position in the hunting-target area, based on the corresponding first presence probability obtained through weighting according to an amount of motion of the moving object.

8. An interference source hunting apparatus configured to hunt for a location of an interference source of electromagnetic waves while moving between multiple measurement points, the multiple measurement points being predetermined positions in a hunting-target area, the interference source hunting apparatus comprising:

a processor; and a storage medium having computer program instructions stored thereon, when executed by the processor, perform to:

acquire strength information indicating a strength of the electromagnetic waves at any of the measurement points;

estimate a distance from the measurement point to the location of the interference source, based on the strength information and propagation losses;

calculate, for each position in the hunting-target area, a first presence probability, based on whether a distance from the measurement point to a position in the hunting-target area is within the distance thus estimated, the first presence probability being a probability that the interference source is present at the position;

update second presence probabilities, based on the first presence probabilities, the second presence probabilities being acquired in the hunting in past and being probabilities that the interference source is present at the positions in the hunting-target;

determine a position obtained by moving, by a predetermined distance, the measurement point toward a position in the hunting-target area with the second presence probability higher than the second presence probability at the measurement point, as a new measurement point; and determine, in a case where a size of an area based on positions each with the second presence probability thus updated greater than or equal to a predetermined value is less than a predetermined value, that the location of the interference source is within the area.

\* \* \* \* \*